United States Patent [19]
Price, IV, et al.

[11] Patent Number: 5,460,506
[45] Date of Patent: Oct. 24, 1995

[54] HOME PASTA MAKER

[75] Inventors: James H. Price, IV, Parkville, Mo.; Eddy Kang, Taipei; Benny Lee, Hsin, both of Taiwan

[73] Assignee: Mitco International, Ltd., Kowloon, Hong Kong

[21] Appl. No.: 370,505

[22] Filed: Jan. 9, 1995

[51] Int. Cl.$^6$ .............................. A21C 3/04; A21C 11/16; B29B 1/06; B01F 7/18
[52] U.S. Cl. .............................. 425/190; 99/348; 99/353; 366/98; 366/299; 366/309; 366/158.1; 366/329.1; 425/191; 425/197; 425/205
[58] Field of Search .................. 99/348, 353; 241/101.1; 366/98, 99, 279, 158, 309, 299, 314; 425/151, 190, 191, 197, 205, 72.2, 376.1, 382.3

[56] References Cited

U.S. PATENT DOCUMENTS

| | | | |
|---|---|---|---|
| 4,146,333 | 3/1979 | Zani | 366/99 |
| 4,219,318 | 8/1980 | Cavalli | 425/190 |
| 4,269,582 | 5/1981 | Mella | 425/190 |
| 4,332,539 | 6/1982 | Zani | 425/151 |
| 4,367,064 | 1/1983 | Prandelli et al. | 366/98 |
| 4,376,624 | 3/1983 | Osrow et al. | 99/353 |
| 4,383,813 | 5/1983 | Podell et al. | 425/376.1 |
| 4,391,575 | 7/1983 | Osrow | 425/190 |
| 4,406,603 | 9/1983 | Williams | 425/191 |
| 4,415,323 | 11/1983 | Osrow et al. | 425/72.2 |
| 4,470,793 | 9/1984 | Cavalli | 425/191 |
| 5,401,159 | 3/1995 | Hsu | 99/348 |

*Primary Examiner*—Timothy F. Simone
*Attorney, Agent, or Firm*—Hovey, Williams Timmons & Collins

[57] ABSTRACT

An improved pasta maker (20) is provided having an upper mixing chamber (130), lower extrusion chamber (132), and a communicating passageway (157) therebetween. The mixing chamber (130) is an open top vessel, and the extrusion chamber (132) presents an outlet (148) adapted to receive a pasta forming die (188). The pasta maker (20) also includes an apertured slide valve plate (26), a powered, rotatable mixing element (170) within the mixing chamber (130) for mixing of the ingredients therein, and a powered, axially rotatable auger (174) within the extrusion chamber (132) for conveying the ingredients towards and through the die (188). The valve plate (26) is removably and shiftably mounted within the passageway (157) for selective movement between a first mixing position blocking communication between the chambers (130, 132), a second feeding position wherein the plate aperture (214) is in registry with openings (136, 150) for communicating the chambers (130, 132), and a third cleaning position wherein the plate (26) is detached from the passageway (157). In the second position, the valve plate (26) is restrained from outward movement towards the third position by interengagement of a pair of laterally spaced, upstanding nibs (220) formed on the plate (26) and the inner surface of sidewall (34) of the machine, and restrained from inward movement towards the first position by the mixing element (170), upon the rotation of the same and when mixed pasta making ingredients are in the mixing chamber (130), urging the plate (26) outwardly.

18 Claims, 6 Drawing Sheets

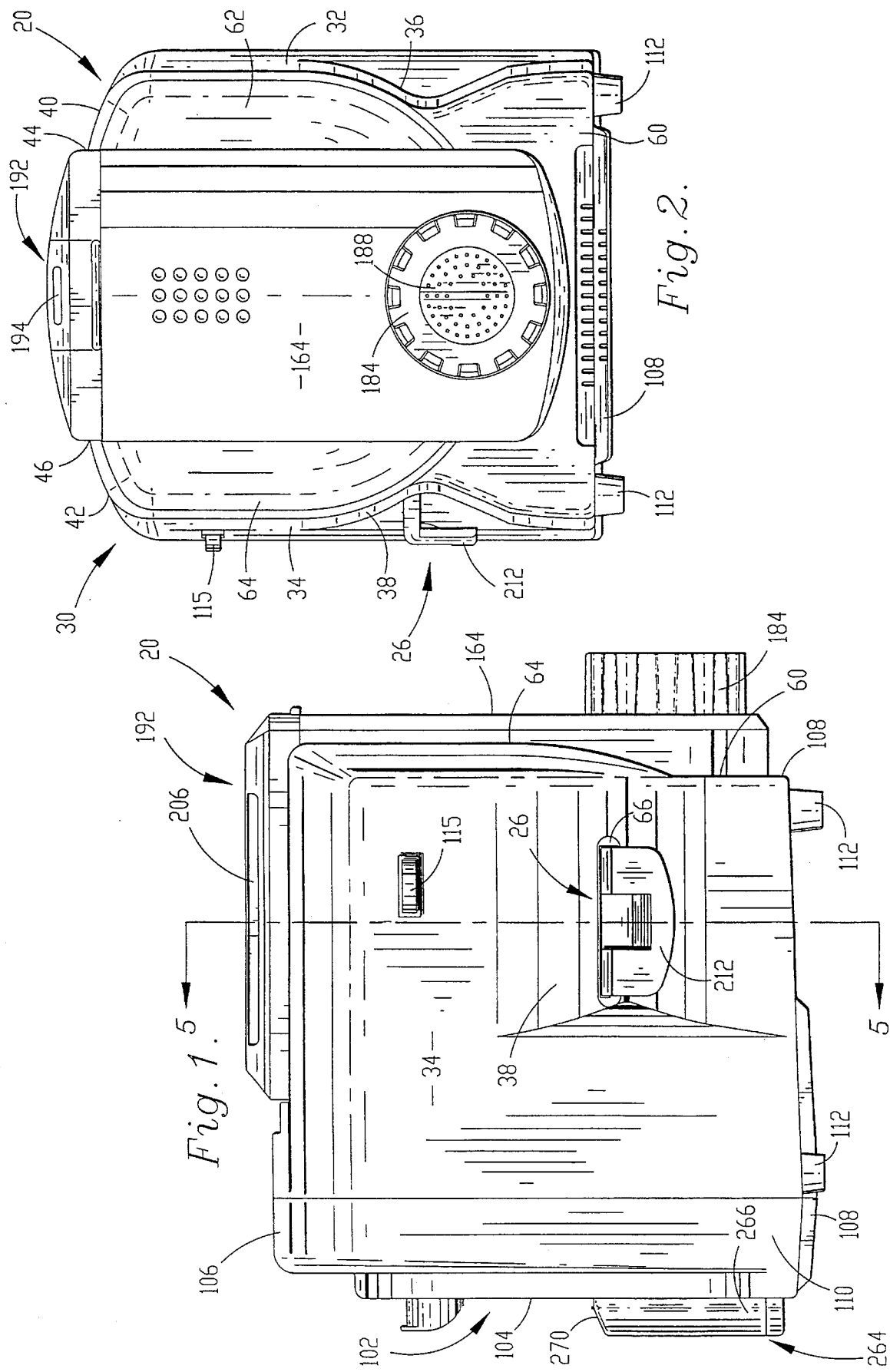

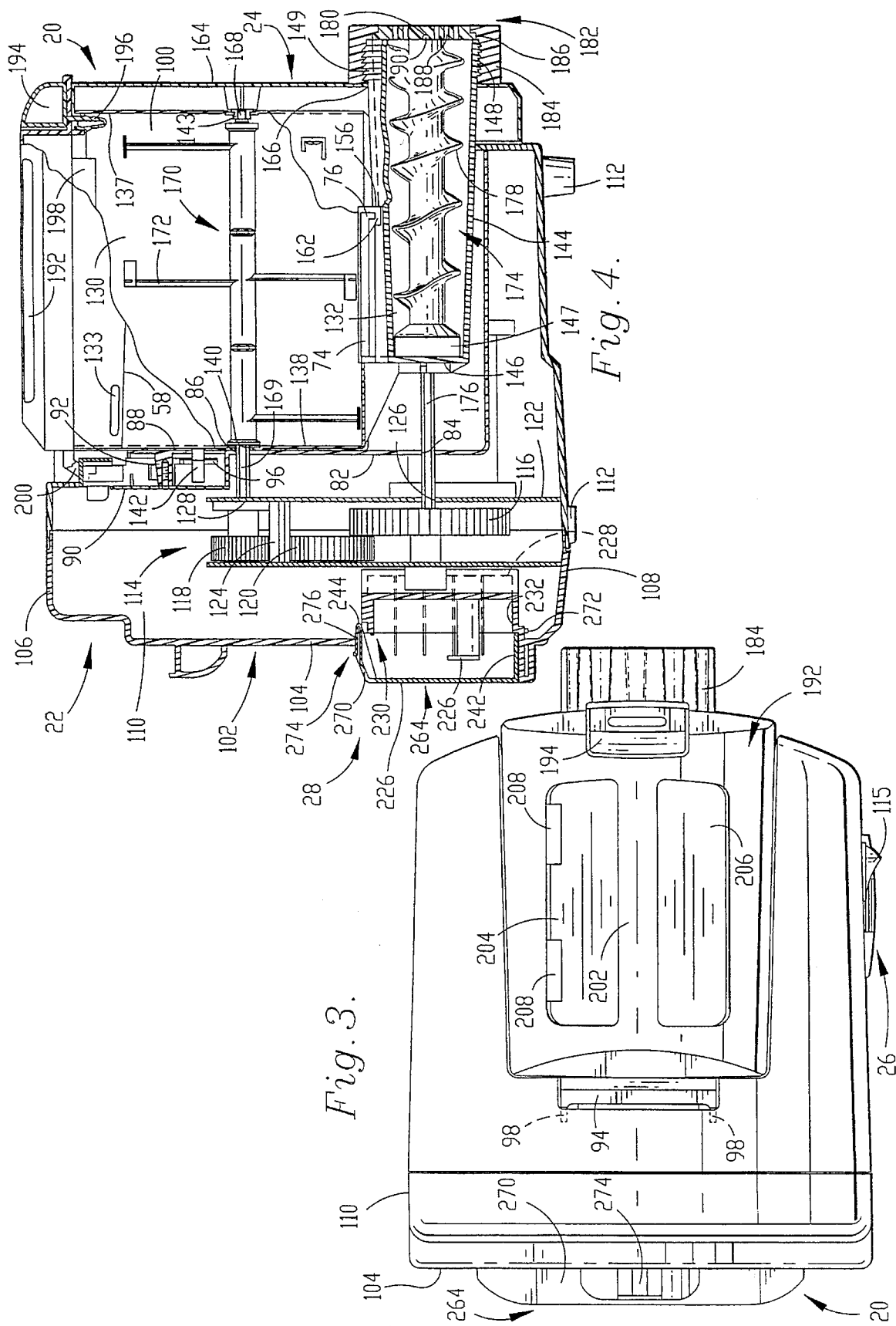

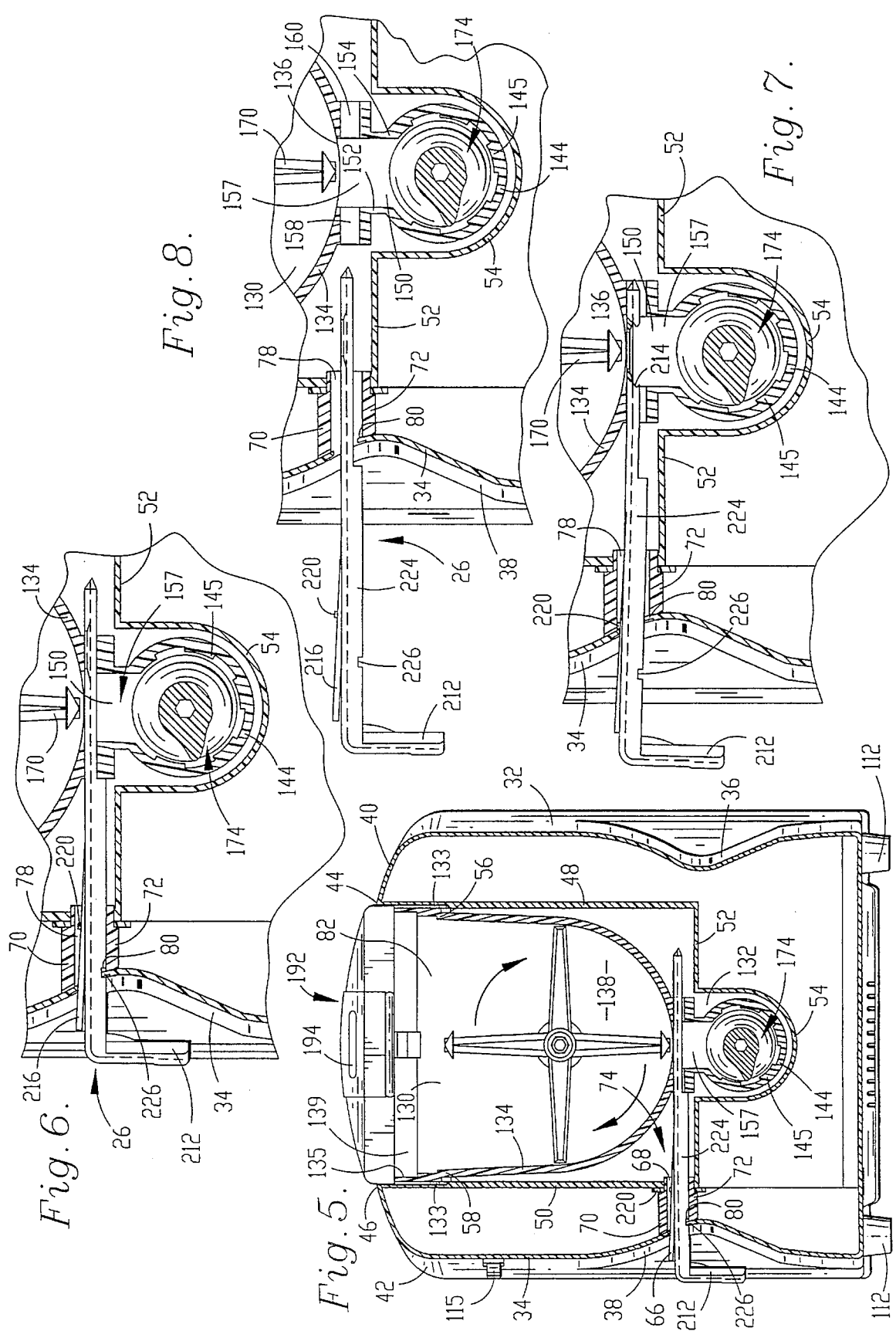

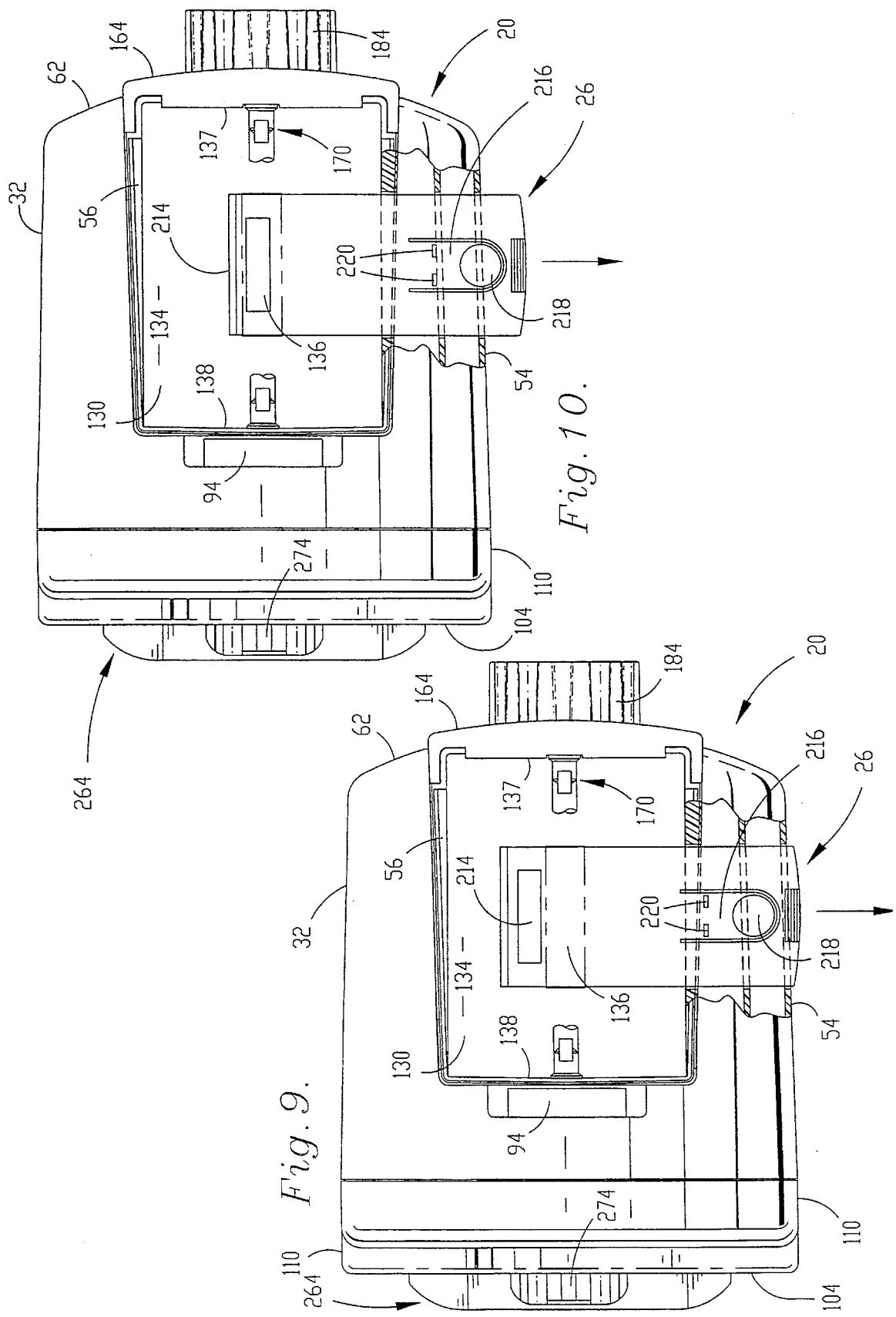

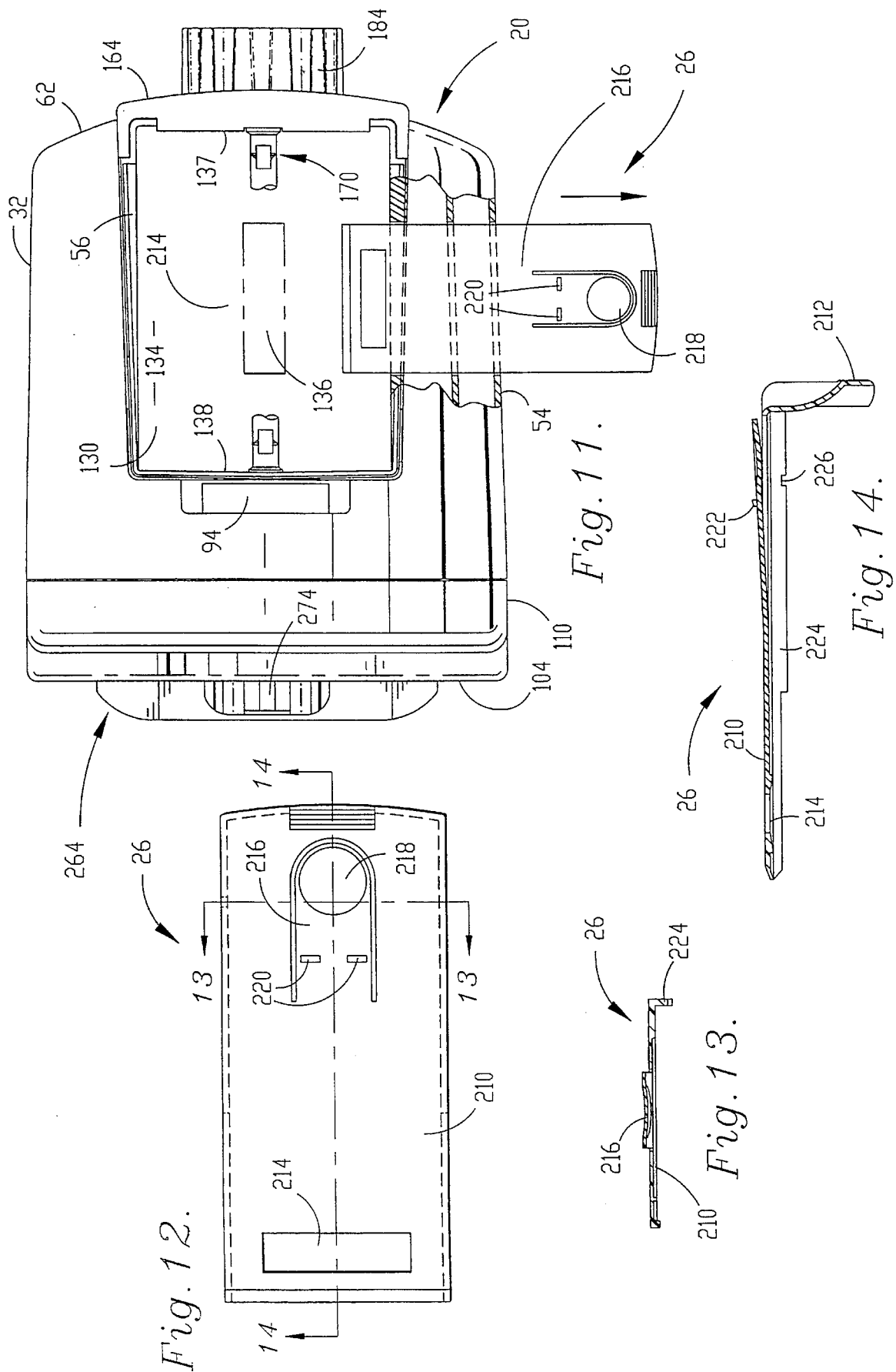

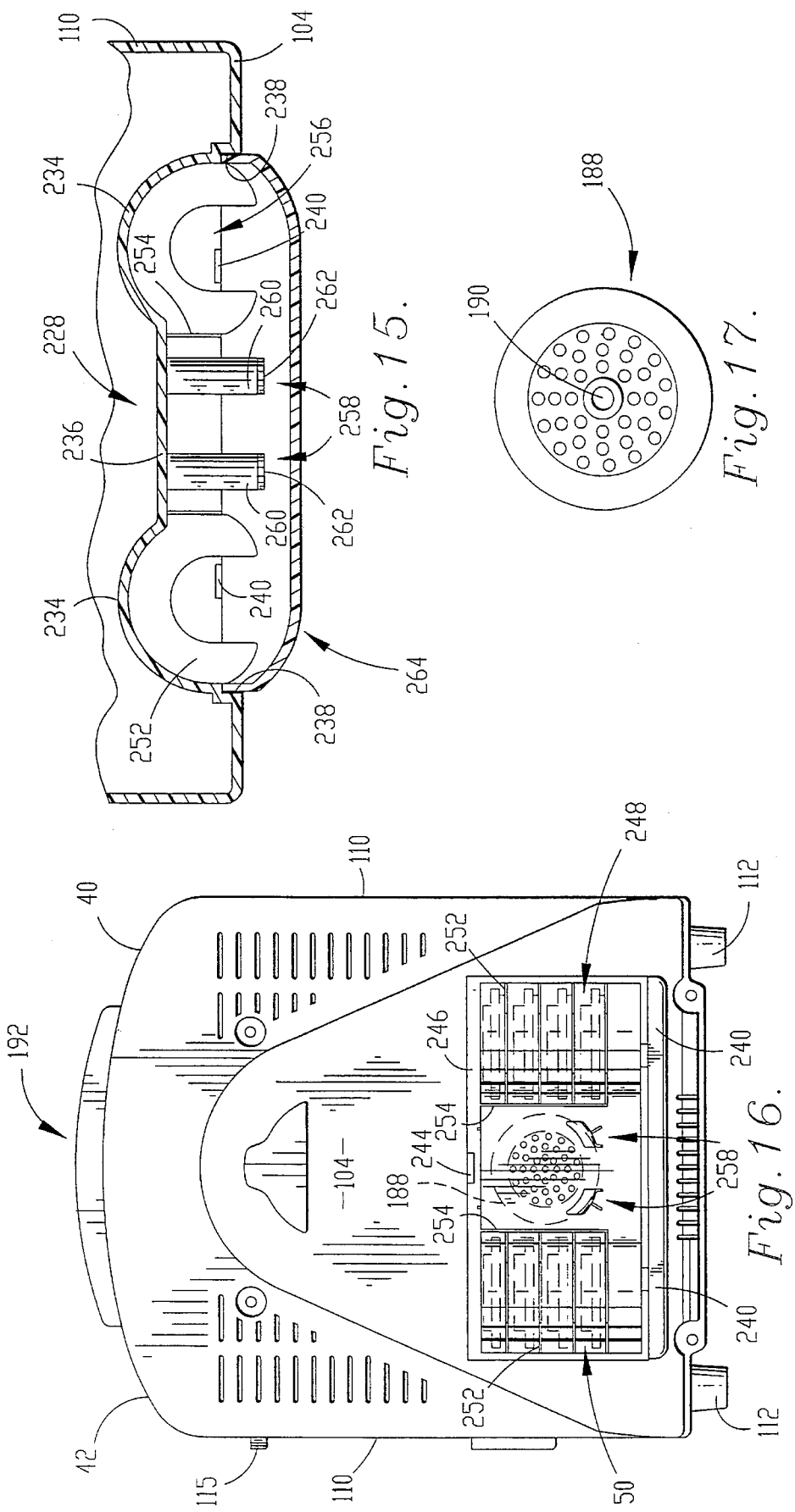

HOME PASTA MAKER

BACKGROUND OF THE INVENTION

1. Field of the Invention

The present invention relates generally to a pasta making machine for domestic use having a mixing chamber and an extrusion chamber with a communicating passageway therebetween, the extrusion chamber having an outlet adapted to receive a pasta forming die. More particularly, the invention pertains to a pasta maker having an apertured valve plate removably and shiftably mounted within the passageway for selective movement between various operating conditions, wherein specialized structure is provided for maintaining the valve plate in selected use positions. Additionally, the preferred form of the invention includes die storage structure for storing various dies when not mounted on the outlet of the extrusion chamber.

2. Discussion of the Prior Art

It is known to provide a pasta machine for mixing and shaping pasta making ingredients into to various commonly known shapes. Conventional machines have a mixing chamber with a rotating mixer therein for mixing the pasta making ingredients to a prescribed dough consistency. An extrusion chamber provided with an auger screw or extruder plunger therein communicates with the mixing chamber via a material passageway. The extrusion chamber has an outlet which is typically adapted to receive a number of different dies to form a variety of pasta shapes. Once the ingredients reach the proper dough consistency the auger screw or plunger forces the dough through the die to form a desired pasta shape.

These pasta machines may also have a gate or shutter removably mounted within the material passageway to selectively block the same. The gate or shutter blocks the material passageway during mixing of the ingredients, temporarily preventing the ingredients from passing to the extrusion chamber via the passageway. Once the ingredients reach the proper dough consistency, the gate or shutter is removed from the passageway allowing the dough to pass therethrough into the extrusion chamber. Alternatively, the gate or shutter is provided with an aperture which allows the dough to flow therethrough when the aperture is moved into registry with the passageway.

Initially, gates were formed of a flat, elongated plate. These plates were simply constructed and implemented as a discrete component which was easily removed from the pasta machine for cleaning and machine disassembly. However, original plates failed to provide structure for maintaining the gate in the passageway-blocking position ("mixing position") or chambers-communicating position ("feeding position"). Proficiency demanded a pasta maker which retained the plate in the various operating positions without requiring the user to manually hold the plate in such positions.

In response to this demand, it has been known to provide pasta machines with structure to retain the gate or shutter in the various operating positions. This later version of the plate is commonly spring biased into the mixing position. The gate is movable to the second feeding position and counteracts the spring bias, maintaining the gate in the second position, by releasably engaging structure of the pasta machine.

Although later versions of a valve plate represent designs which selectively maintain the gate in various operating positions, several shortcomings remain. For example, these valve plates tend to be fixedly attached to the pasta machine precluding removal therefrom. Additionally, the later valve plates incorporate complex structure for maintaining the plates in the various operating positions. A complex design inherently breeds expensive fabrication, difficulty in cleaning, and limited access. Thus, there is a need to provide a valve plate of simple construction having structure for maintaining the same in the various operating positions, the plate being quickly, easily, and wholly removable from the pasta machine for cleaning and disassembly.

Further, it is known to provide a pasta machine, as previously described, with a storage compartment for the various dies. Conventionally, die storage compartments were simple box-like stalls within the pasta machine housing. In these traditional compartments dies were loosely and haphazardly stored. Such an arrangement is unsanitary. As is known in the food processing arts, preparation utensils which come into direct contact with food should be handled as little as possible by the cook. Clearly, conventional die storage compartments require the food preparer to handle a number of the dies until the desired die is found.

Additionally, traditional die storage compartments are open topped boxes allowing the stored dies to become filthy from spilled ingredients or accumulated dust. Further, the opening of the die storage compartment inhibits easy transportation of the pasta machine as the dies will have a tendency to drop out of the compartment. Although pasta maker accessory compartments have been furnished with a cover, there is a need for an enclosed die storage compartment which stores the dies in an orderly fashion. Moreover, conventional storage compartment covers are either not removable, elaborately attached to the pasta maker, or an integral part of the maker, which hampers cleaning of the cover.

SUMMARY OF THE INVENTION

The present invention overcomes the problems outlined above, and provides a pasta maker including upper mixing and lower extrusion chambers having a communicating passageway therebetween. The mixing chamber presents an inlet for introduction of pasta making ingredients thereinto, and the extrusion chamber presents an outlet adapted to receive a pasta forming die. The pasta machine also includes an apertured slide valve plate, a rotatable mixing element within the mixing chamber for mixing of the ingredients therein, and a rotatable auger within the extrusion chamber for conveying the ingredients towards and through the die. Further, the preferred machine includes structure for removably and shiftably mounting the valve plate within the passageway for selectively moving the valve plate between a first mixing position blocking communication between the chambers to permit thorough mixing of the ingredients in the mixing chamber, a second feeding position wherein the plate aperture is in registry with the passageway for communicating the chambers and permitting passage of the mixed ingredients from the mixing to the extrusion chamber, and a third cleaning position wherein the plate is detached from the passageway-defining structure. The valve plate mounting structure serves to releasably hold the valve plate in the second position against inadvertent detaching movement thereof to the third position while permitting substantially unrestrained movement of the plate from the second to the first position. Additionally, the mixing element, upon the rotation of the same and when mixed pasta making ingredients are in the mixing chamber, urges the plate in a direction to prevent movement of the plate from the second to the first position.

Thus, the rotational direction of the mixing element and mixed ingredients in the mixing chamber, and the structure for releasably holding the plate in the second position, cooperatively maintain the plate in the second position during feeding of the mixed ingredients from the mixing to the extrusion chamber. Accordingly, structure for preventing movement of the plate from the feeding position to the mixing position is eliminated. As such, the improved valve plate design is simpler, rendering the plate easier to shift to the various operating positions, clean, and remove.

Additionally, the preferred pasta maker includes walls defining a die-receiving recess, and a removable cover disposed over the recess, there being shelf structure within the recess for holding a plurality of the dies in adjacent, spaced apart, and stacked relationship.

BRIEF DESCRIPTION OF THE DRAWING FIGURES

FIG. 1 is a side elevational view of a pasta maker constructed in accordance with the preferred embodiment of the invention;

FIG. 2 is a front elevational view of die end of the pasta maker depicted in FIG. 1;

FIG. 3 is a plan view of the pasta maker depicted in FIG. 1;

FIG. 4 is a vertical sectional of the FIG. 1, apparatus illustrating the mixing and extrusion chambers, the die storage compartment, and a portion of the transmission;

FIG. 5 is a vertical sectional view taken along line 5—5 of FIG. 1, illustrating the direction of rotation of the mixer and the valve plate in its mixing position;

FIG. 6 is an enlarged fragmentary view similar to FIG. 5, but illustrating the valve plate in the mixing position thereof;

FIG. 7 is an enlarged fragmentary view similar to FIG. 6, but illustrating the valve plate in the feeding position;

FIG. 8 is an enlarged fragmentary view similar to FIG. 6, but illustrating the valve plate between the feeding position and cleaning position thereof;

FIG. 9 is a top view partially in section and with parts broken away of the preferred pasta mater, illustrating the valve plate in the mixing position thereof;

FIG. 10 is a top view similar to FIG. 9, but illustrating the valve plate in the feeding positions thereof;

FIG. 11 is a top view similar to FIG. 9, but illustrating the valve plate between the feeding position and cleaning positions thereof;

FIG. 12 is a plan view of the preferred valve plate;

FIG. 13 is a vertical sectional view taken along line 13—13 of FIG. 12;

FIG. 14 is a vertical sectional view taken along line 14—14 of FIG. 12;

FIG. 15 is a fragmentary sectional view of the die storage compartment forming a part of the preferred pasta maker;

FIG. 16 is a rear elevational view of the pasta maker, with imaginary lines depicting the structure within the die storage compartment for holding of pasta dies; and FIG. 17 is a rear view of a typical spaghetti die.

DETAILED DESCRIPTION OF THE PREFERRED EMBODIMENT

Turning now to the drawings, and particularly FIGS. 1–4, a pasta maker 20 in accordance with the invention is illustrated. Broadly speaking, the pasta maker 20 includes a main housing assembly 22, a removable, dual-chamber mixing and extrusion assembly 24, a valve plate 26 operatively coupled with the assemblies 22, 24, and a die holding compartment 28.

In more detail, main housing assembly 22 is in the form of an upright body 30 having synthetic resin walls and presenting a pair of opposed sidewalls 32, 34 each having a corresponding concavo-convex depression 36, 38 therein. The sidewalls 32, 34 have mating rounded upper shoulders 40, 42 which terminate to form respective, fore and aft extending top edges 44, 46. The overall body 30 further presents a pair of vertical inner walls 48, 50 each depending from a corresponding top edge 44, 46. An inner bottom wall 52 extends between and joins the lower margins of sidewalls 48, 50, and includes a U-shape in cross-section central segment 54. As best seen in FIG. 5, each of the inner walls 48, 50 is provided with an inwardly extending L-shaped ledge 56, 58 which is important for purposes to be made clear.

A front panel 60 extends between and joins the lower portions of outer sidewalls 32, 34. In addition, the inner and outer sidewalls 32, 48 and 34, 50 are interconnected by upright panel segments 62, 64.

Referring particularly to FIG. 5, it will be observed that the walls 38 and 50 are provided with laterally extending, registered slots 66, 68; moreover, a pair of short internal transverse wall segments 70, 72 are provided adjacent the slots 66, 68. In this fashion, a valve plate slot or guideway 74 is provided which extends completely through the adjacent walls 34, 50. As best seen in FIG. 4, the slot 74 includes a short depending leg section 76 adjacent the forward end of body 30. The upper wall segment 70 has a central recess 78 therein (see FIG. 6), whereas lower wall segment 72 is spaced slightly below the edge of outer sidewall 34 at the region of leg section 76, in order to present an upstanding stop or lip 80.

A back wall 82 extends between the rear margins of inner sidewalls 48, 50. The back wall 82 has a lowermost drive opening 84 therethrough (see FIG. 4) which is positioned substantially centrally relative to central segment 54. In addition, the back wall 82 has an upper drive opening 86 therein with a latch opening 88 slightly above opening 86. Finally, the back wall 82 is provided with a shoulder latching recess 90 having a spring-loaded latching member 92 seated therein. The latching member 92 includes a laterally latch bar 94 provided with a pair of downwardly extending, laterally spreadable, resilient legs 96 which are disposed behind the major portion of back wall 82 and present a latch opening therebetween in registry with opening 88. Finally, a pair of laterally spaced apart openings 98 are provided in the upright portion of recess 90.

It will thus be appreciated that the sidewalls 48, 50, bottom wall 52 and rear wall 82 cooperatively define an open top, open front recess 100 within the confines of main housing assembly 22.

The remainder of housing assembly 22 is made up of a motor and drive case 102 positioned rearwardly of opening 100 and extending forwardly to define the base of the housing assembly. As best illustrated in FIG. 4, the case 102 includes a rear wall 104, top wall 106, bottom wall 108 and marginal sidewalls 110. The bottom wall 104 extends forwardly and merges with front wall 60 to form a monolithic structure. Resilient feet 112 are affixed to base 108 as shown.

The case 112 includes a conventional drive motor (not shown) together with a gear train 114. The motor is selectively powered by a power switch 115 provided on sidewall 34. The gear train includes a lower drive gear 116 as well as upper drive gear 118. The gears 116, 118 are each equipped with a polygonal shaft-receiving insert, with a resilient annular moisture seal being provided at the area of opening 86. As shown, the gear train 114 is located between a pair of spaced apart internal reinforcing plates 120, 122 equipped with conventional reinforcements 124. The reinforcing plate 122 is provided with apertures 126, 128 respectively in register with openings 84, 86 of rear wall 82.

The mixing and extrusion assembly 24 includes a pair of superposed, intercommunicated chambers 130, 132 formed of transparent synthetic resin material. The upper chamber 130 has a generally U-shaped in cross-section sidewall 134 with upper marginal recesses 135, a number of outwardly projecting, longitudinally spaced support members 133 (see FIGS. 4 and 5), and terminates in a rectangular bottom through passage 136. The chamber also has generally planar front and rear walls 137, 138. The rear wall 138 has an upper marginal recess 139, a drive opening 140 therethrough as well as a rearwardly extending, somewhat arrow-shaped latching element 142 secured to the rear face of the wall 138. The front wall 137 has an annular shaft bushing 143 secured therein in registry with rear wall opening 140.

Lower chamber 132 has a substantially circular defining sidewall 144 which is of increasing diameter from the upright, apertured rear wall 146 towards the forward end 148 of the chamber 132. As illustrated, rear wall 142 is equipped with a removable annular nylon bushing 147. The end 148 extends forwardly of upper chamber 130, and presents an outermost, threaded protruding section 149. The defining wall 144 has a plurality of fore and aft extending, circumferentially spaced, inwardly projecting ribs 145 on the inner face of wall 144. Moreover, the wall 144 is relieved at the upper portion thereof as shown at 150, so as to define an opening in substantial registry with passage 136. Referring particularly to FIG. 8, it will be observed that upstanding, laterally spaced apart wall segments 152, 154 are provided to interconnect the upper and lower chambers 130, 132. These wall segments, together with the upper end of rear wall 146 and a short forward connecting wall 156, create a passageway, generally designated 157, between the upper and lower chambers. However, each of the wall segments 152, 154 has an identical valve plate-receiving slot 158, 160 therethrough; each of these slots has a depending, generally square lower section 162 adjacent the forward ends thereof.

The forward end of the assembly 24 is defined by an upright face plate 164 which is secured to the forward end of wall 134 and extends downwardly therefrom. The face plate 164 has a large circular opening 166 therein in registry with the protruding section 149 of chamber wall 144.

Upper chamber 130 is equipped with an elongated, metallic hexagonal drive shaft 169 which extends in a fore and aft direction through rear wall opening 86. The circular, forwardmost end 168 of the shaft is adapted to be received within front wall busing 143. Further, the rearmost end of the shaft 169 extends through opening 128 of plate 122 for receipt within the drive bushing forming a part of gear 118. The shaft supports a paddle-type mixing element 170 within the confines of chamber 130, i.e., between front and rear walls 137, 138. The element 170 includes an elongated, hexagonal drive shaft opening along the length thereof, as well as a plurality of axially spaced, radially projecting mixing arms 172.

The lower chamber 132 is equipped with an auger element 174 of variable pitch and increasing outer diameter. The element 174 includes a hexagonal central drive shaft 176 as well as molded synthetic resin auger flighting 178. As best seen in FIG. 4, the shaft 176 of auger element 174 extends through bushing 147 and openings 84, 126 for receipt within the drive bushing forming a part of gear 116. The forward end of auger shaft 176 terminates in a rounded tip 180.

The forwardmost end of the lower chamber 132 is provided with a pasta die assembly generally referred to by the numeral 182. The latter comprises an internally threaded, synthetic resin nut 184 having a central opening 186 in the front face thereof. An apertured extrusion die 188 is seated within the nut 184, in registry with opening 186. The die 188 has a rearward, annular cavity 190 which receives the forward projecting tip 180 of auger shaft 176.

The assembly 24 is surmounted by a removable lid member 192. The lid member includes a resilient latch 194 at the forward end thereof including a depending tongue 196 adapted to interfit with the upper margin of face plate 164 to assist in removably holding the lid member in place. The side marginal edges of the lid member include downwardly extending flange sections 198 adapted to fit within the upper recesses 135. Similarly, the rear marginal edges of the lid member have a similar flange which is received within rear wall recess 139. However, the rear wall of the lid member has a pair of laterally spaced, rearwardly extending attachment feet 200 which are located to fit within the recess openings 98.

The lid member 192 has an upstanding central rib 202 as well as respective lateral depressions 204, 206 astride the rib. The depression 204 (see FIG. 3) has a pair of slots 208 formed therein in order to communicate with the interior of chamber 130 through the lid member.

The valve plate 26 presents a substantially flat, elongated web 210 and a depending handle section 212 at the outboard end of the web. Preferably, the valve plate is formed of a synthetic resin material. Referring to FIG. 12, it will be seen that the web 210 includes a rectangular opening 214 adjacent the inboard end of the web. The plate further includes a U-shaped resilient segment 216 therein. The U-shaped segment 216 includes a circular finger depression 218 in the upper face thereof, as well as a pair of laterally spaced, upstanding nibs 220 on the segment 216. The nibs 220 present an inboard facing cam surface 222 as best seen in FIG. 14. Finally, the plate includes a depending leg 224 along a portion of one side margin thereof. A notch 226 is provided in the leg 224.

The die holding compartment 28 is recessed within the rear of case 102 and is generally defined by a dumbbell-shaped front wall 228 (see FIG. 15) and horizontal top and bottom walls 230, 232. The front wall 228 presents opposed circular end portions 234, a flat central portion 236, and a seat portion 238 extending along the outermost edges thereof. The bottom wall 232 includes a vertically displaced step 242 and a pair of laterally spaced slots 240. Furthermore, a catch opening 244 is provided in top wall 230.

As best shown in FIGS. 15 and 16, the die holding compartment 28 includes two series of laterally spaced horizontal die storage shelves 248, 250 extending from the circular end portion 234 of front wall 228. The series of shelves comprise a number of vertically spaced apart shelves 252, and a vertically disposed partition wall 254 extending from the top wall 230 and terminating in the bottommost shelf. Each shelf is similarly U-shaped, having a central finger slot 256 therein. As is apparent, each shelf is adapted to receive a single die 188.

Further, the compartment includes a pair of laterally spaced, L-shaped support members 258 which extend rearwardly from the central portion 236 of wall 228. The support members 258 each present an inclined web member 260 and vertical outer flange member 262. As shown in FIG. 16, the supports are spaced such that the web members 260 support a number of the dies 188 in an upright, face-to-face position while the flanges 262 maintain the dies in the upright position.

A cover 264 is disposed over the die holding compartment. The cover 264 has a generally U-shape in cross-section end wall 266 which terminates in a flat lower wall 268 and beveled upper wall 270. A pair of laterally spaced lugs 272 depend from the lower wall 268 and are adapted to be received in slots 240. Further, the upper wall 270 has a centrally displaced resilient catch 274 thereon. The catch 274 is adapted to be received in opening 244 and has a pair of upstanding tines 276 formed thereon to releasably engage the inner surface of rear wall 104. As apparent from FIGS. 4 and 15, the cover 264 abuts the seat portion 238 and the step 242 when disposed over the die holding compartment 28.

In operation, a type of pasta is selected and the appropriate die is removed from the die storage compartment 28 with minimal handling by the operator. The storage compartment cover 264 is removed by depressing catch 274 which disengages tines 276 from the inner surface of rear wall 104. The desired die may be removed from the upright position maintained by the L-shaped support members 258. Alternatively, the desired die is removed from one of the shelves 252 by inserting a finger in the appropriate slot 256 and sliding the die therefrom. Conventionally, the die apertures may take a variety of shapes which form, among other things, ziti macaroni, fettucini, tagliatelle, linguini, and pappardelle. The pasta maker, when provided with the proper die, may also function as a cookie maker and form such cookies as biscotti.

It will be appreciated that the pasta maker is assembled in five simple steps. First, the mixing element 170 is held within the upper chamber 130 such that the drive shaft opening of the element is in register with the front wall bushing 143 and rear wall opening 140. The circular end 168 of drive shaft 169 is then inserted through the opening 140 and the mixing element 170, and ultimately into the bushing 143.

Second, the dual-chamber assembly 24 is releasably locked within the front recess 100 of the housing assembly 22. This is accomplished by placing the dual-chamber assembly 24 within the recess 100 such that the support members 133 on opposite sides of sidewall 134 slidably engage the L-shaped ledges 56, 58 provided on inner walls 48, 50. The dual-chamber assembly is subsequently slid rearwardly, projecting the arrow-shaped latching element 142 and drive shaft 169 into their respective openings 86 and 88 of back wall 82. Upon further rearward movement of the assembly 24, latching element 142 lockably engages legs 96 of latching member 92, and the drive shaft 169 projects through aperture 128 of plate 122 and is received within the shaft-receiving insert of drive gear 118. Note, the mixing element may require some rotation before the hexagonal drive shaft is properly seated within the insert. Moreover, the dual-chamber assembly 24 is prevented from detaching, forward movement by the releasable interengagement of element 142 and legs 96.

Third, the auger element 174 is placed in the lower chamber 132. This step involves placing nylon bushing 147 on the drive shaft 176 adjacent the auger flighting 178. Thereafter, the auger element 174 is inserted through end 148, into the lower chamber 132, and is ultimately received within the shaft-receiving insert of drive gear 116.

Fourth, the valve plate 26 is completely inserted through slots 74, 158, 160 into a mixing position such that plate opening 214 is out of registry with passageway 136 and opening 150, blocking communication therebetween (see FIGS. 5, 6, and 10). The leg 224 of the valve plate and associated leg 76 of the slot insures that the plate is received in the slots in a single direction. Moreover, the camming surface 222 of valve plate nibs 220 depress the segment 216 during inward movement of the plate, allowing the nibs to clear sidewall 34 during such movement. The plate is retained in the mixing position by notch 226 interlocking stop 80 (see particularly FIG. 6).

Finally, the pasta die assembly 182 is fastened to the forwardmost end of the lower chamber 132. Preferably, prior to mounting the selected die 188 to the extrusion chamber 132, the die is submerged in a mixture of warm water and olive oil for 2 to 3 minutes. Thereafter, the die 188 is seated within the nut 184. The nut 184 is then screwed to the threaded section 149 which sealingly engages die 188 to end 148 of chamber 132. Furthermore, the tip 180 of auger shaft 176 is journaled within cavity 190 of the die for relative rotation therebetween.

After proper assembly and with the valve plate 26 blocking communication between the upper and lower chambers, the ingredients may be added to the upper chamber 130. Typical ingredients include white or semolina flour, eggs, water and olive oil. Preferably, the dry ingredients are placed in the upper chamber and the lid member 192 is attached thereto. As is apparent from FIG. 4, the latch tongue 196 of the lid releasably engages face plate 164, and attachment feet 200 are received in recess openings 98 of back wall 82. Preferably, an electrical safety switch (not shown) is attached to the rear surface of wall 82 so that when the lid is attached to the mixing chamber and the feet 200 extend through the openings, the switch is actuated. The switch is wired to override power switch 115 and power the electric drive motor only upon actuation by feet 200.

With the dry ingredients within upper chamber 130 and the lid member 192 secured thereto, the power switch 115 is moved to the on position causing the mixing element 170 to rotate in the direction of the arrows in FIG. 5. A portion of the liquid ingredients (i.e., oil, egg, and water) are then poured slowly into depression 204 permitting the ingredients to pass through slots 208 and into chamber 130. After adding all but about 10% of the liquid ingredients called for in the recipe, the mixer is allowed to rotate for about 3 minutes. Thereafter, the dough consistency is examined by first moving the switch 115 to the off position to stop the mixing element 170, and then removing the lid 192. Note, removal of the lid 192 disconnects the feet 200 from the safety switch which prevents further rotation of the mixing element 170 by the electrical motor. At this time, more liquid or dry ingredients may be added to attain the proper dough consistency of small, pea-sized lumps.

Once the proper dough consistency is obtained, the valve plate 26 is lifted slightly to disengage the notch 226 from the stop 80, and the plate is moved outwardly to a feeding position (see FIGS. 7 and 10). In the feeding position, the plate opening 214 is in registry with passageway 136 and opening 150, permitting communication between upper and lower chambers, 130 and 132 respectively. The plate opening 214 meters flow from the upper chamber to the lower chamber by restricting the hole defined by passageway 136 (see FIG. 10). More importantly, the valve plate 26 is restrained from inadvertent outward movement by interengagement of the outboard surface of nibs 220 and the inner surface of sidewall 34. Further, the ingredients rotatively mixed in the direction of the arrows in FIG. 5, impart a tangential and angular force on the plate 26 which restrains the same from inadvertent inward movement.

With the valve plate 26 held in the feeding position, extrusion of the desired pasta shape is accomplished. The auger element 174 is continuously driven but only effectuates extrusion when the plate 26 is in the feeding position. Additionally, the conventional auger flighting 178 and design of the lower chamber sidewall 144 provide continuous flow through the apertures of pasta die 188. Further, extrusion through the die may be delayed for some time as the pasta passes from the upper chamber 130 and through the lower chamber 132. Accordingly, the auger element 174 must be driven for a period of time after the upper chamber 130 has emptied since the lower chamber 130 may still contain dough.

Once the extrusion process is complete, the pasta maker may be disassembled for cleaning. As best shown in FIGS. 8 and 11, the valve plate is moved outwardly to a cleaning position by manually pressing the resilient segment 216 downward. The downward movement of segment 216 disengages the nibs 220 from the inner surface of sidewall 34 and allows the plate to be wholly removed from the slots 74, 158, 160.

The lid member 192 is detached by depressing latch 194 which, in turn, disengages depending tongue 196 from the face plate 164. Upon removal of the lid 192, the latching recess 90 becomes accessible. Consequently, the latch member 92 may be manually triggered to spread the legs 96 and disengage latching element 142. Such disengagement allows the dual-chamber assembly 24 to be disconnected from the housing assembly 22. Additionally, by reversing the assembly description above, the mixing element 170, drive shaft 169, auger element 174, nut 184, dies 188, and die holding compartment cover 266 may be removed to facilitate cleaning of the pasta maker. Furthermore, for obvious reasons, these removable components are preferably formed of a dishwasher-safe, synthetic resin material.

We claim:

1. A pasta maker, comprising:

structure including walls defining upper and lower chambers having a communicating passageway therebetween, said upper chamber presenting an inlet for introduction of pasta making ingredients thereinto, said lower chamber presenting an outlet adapted to receive a pasta forming die;

a rotatable mixing element within said upper chamber for mixing of said ingredients therein;

a rotatable auger within said lower chamber for conveying said ingredients towards and through said die;

an apertured slide valve plate; and means removably and shiftably mounting said valve plate within said passageway for selective shifting movement thereof between a first mixing position blocking communication between said chambers to permit thorough mixing of the ingredients in the upper chamber, a second feeding position wherein the plate aperture is in registry with said passageway for communicating the chambers and permitting passage of the mixed ingredients from the upper to the lower chamber, and a third cleaning position wherein the plate is detached from said passageway-defining structure, said valve plate mounting means including means for releasably holding said plate in said second position against inadvertent detaching movement thereof to said third position while permitting substantially unrestrained movement of the plate from said second to said first position, said mixing element, upon said rotation thereof and when mixed pasta making ingredients are in the upper chamber, urging said plate in a direction to prevent said movement of the plate from the second to the first position thereof, whereby the rotation of said mixing element and the movement of said mixed ingredients, and said holding means, cooperatively maintain the plate in said second position thereof during feeding of the mixed ingredients from the upper to the lower chamber.

2. The apparatus of claim 1, wherein said valve plate comprises an elongated, generally rectangular, substantially flat element presenting a pair of side margins and including a leg depending from one of said side margins.

3. The apparatus of claim 2, wherein said element presents a pair of end margins, there being a handle depending from one of said end margins.

4. The apparatus of claim 1, said valve plate mounting means including structure for releasably retaining said valve plate in said first mixing position thereof.

5. The apparatus of claim 4, said retaining structure comprising a stop formed adjacent said passageway, and a cooperating notch formed in said valve plate and selectively engageable with said stop.

6. The apparatus of claim 1, wherein the holding means includes a resilient segment carried by said plate and engageable with said structure, said segment being manually movable to a detach position where the segment is out of locking engagement with said structure.

7. The apparatus of claim 6, including an upstanding nib on said segment, there being a lip formed on said structure engageable with said nib.

8. The apparatus of claim 7, said nib including a camming surface for engaging said lip during movement of said plate from said third position to said second position thereof for depression of said segment to allow the nib to clear said lip.

9. A pasta maker, comprising:

structure including walls defining upper and lower chambers having a communicating passageway therebetween, said upper chamber presenting an inlet for introduction of pasta making ingredients thereinto, said lower chamber presenting an outlet adapted to receive a pasta forming die;

a rotatable mixing element within said upper chamber for mixing of said ingredients therein;

a rotatable auger within said lower chamber for conveying said ingredients towards and through said die;

an apertured slide valve plate; and means removably and shiftably mounting said valve plate within said passageway for selective shifting movement thereof between a first mixing position in blocking communication between said chambers to permit thorough mixing of the ingredients in the first chamber, a second feeding position wherein the plate aperture is in registry with said passageway for communicating the chambers and permitting passage of the mixed ingredients from the upper to the lower chamber, and a third cleaning position wherein the plate is detached from said passageway-defining structure, said valve plate mounting means including a resilient segment carried by said plate and releasably and lockably engaging said structure to hold the plate in said second position against inadvertent detaching movement thereof to said third position, said segment being manually movable to a detach position where the segment is out of locking engagement with said structure, in order to permit movement of the plate between the second and third positions thereof.

10. The apparatus of claim 9, wherein said valve plate comprises an elongated, generally rectangular, substantially flat element presenting a pair of side margins and including a leg depending from one of said side margins.

11. The apparatus of claim 10, wherein said element presents a pair of end margins, there being a handle depending from one of said end margins.

12. The apparatus of claim 9, said valve plate mounting means including structure for releasably retaining said valve plate in said first mixing position thereof.

13. The apparatus of claim 12, said retaining structure comprising a stop formed adjacent said passageway, and a cooperating notch formed in said valve plate and selectively engageable with said stop.

14. The apparatus of claim 9, including an upstanding nib on said segment, there being a lip formed on said structure engageable with said nib.

15. The apparatus of claim 14, said nib including a camming surface for engaging said lip during movement of said plate from said third position to said second position thereof for depression of said segment to allow the nib to clear said lip.

16. In a pasta maker including structure for receiving and mixing pasta making ingredients, and for extruding the mixed ingredients through any one of a number of different pasta forming dies to produce pasta of different shapes, the improvement which comprises walls defining a die-receiving recess, and a removable cover disposed over said recess, there being shelf means within said recess for holding a plurality of dies in adjacent, spaced apart, stacked relationship.

17. The apparatus of claim 16, said shelf means comprising a plurality of vertically spaced apart shelf elements, each of said shelf elements presenting a recess of sufficient width to allow manual lifting and grasping of a die supported thereon.

18. The apparatus of claim 16, including a pair of laterally spaced apart L-shaped members for supporting a plurality of dies in an upright orientation within said-die-receiving recess.

* * * * *